United States Patent [19]

Yarnell

[11] Patent Number: 4,550,628

[45] Date of Patent: Nov. 5, 1985

[54] TRANSMISSION INTERLOCK SYSTEM

[75] Inventor: James A. Yarnell, Temperance, Mich.

[73] Assignee: Dana Corporation, Toledo, Ohio

[21] Appl. No.: 585,802

[22] Filed: Mar. 2, 1984

[51] Int. Cl.[4] .............................................. G05G 5/10
[52] U.S. Cl. ..................................... 74/477; 74/483 R
[58] Field of Search ............................... 74/477, 483 R

[56] References Cited

U.S. PATENT DOCUMENTS

| | | | |
|---|---|---|---|
| 1,229,655 | 6/1917 | Richardson | 74/477 X |
| 1,491,283 | 4/1924 | Alspaugh | 74/477 |
| 1,943,694 | 1/1934 | Padgett | 74/477 X |
| 2,242,027 | 5/1941 | Fishburn | 74/475 |
| 2,847,871 | 8/1958 | Schick | 74/477 |
| 2,953,035 | 9/1960 | Herr, Jr. | 74/477 |
| 3,780,602 | 12/1973 | Thomley | 74/477 X |

Primary Examiner—A. Michael Chambers
Assistant Examiner—John C. Fox
Attorney, Agent, or Firm—Frank B. McDonald

[57] ABSTRACT

A transmission interlock system includes poppet interlocks and pins alternately disposed transversely through and between alignable pin bores in the shift rods. The interlocks define small and large diameter portions disposed for extension into the pin bores. In a preferred form, both interlocks and pins define shoulders which limit movement of those members with respect to corresponding shift rods. Each interlock shoulder, excepting one in direct contact with a spring, is disposed for limiting movement thereof by contact with the extremity of a pin bore in a communicating rod, while each pin shoulder is disposed for making contact with a mating shoulder in a bore.

11 Claims, 1 Drawing Figure

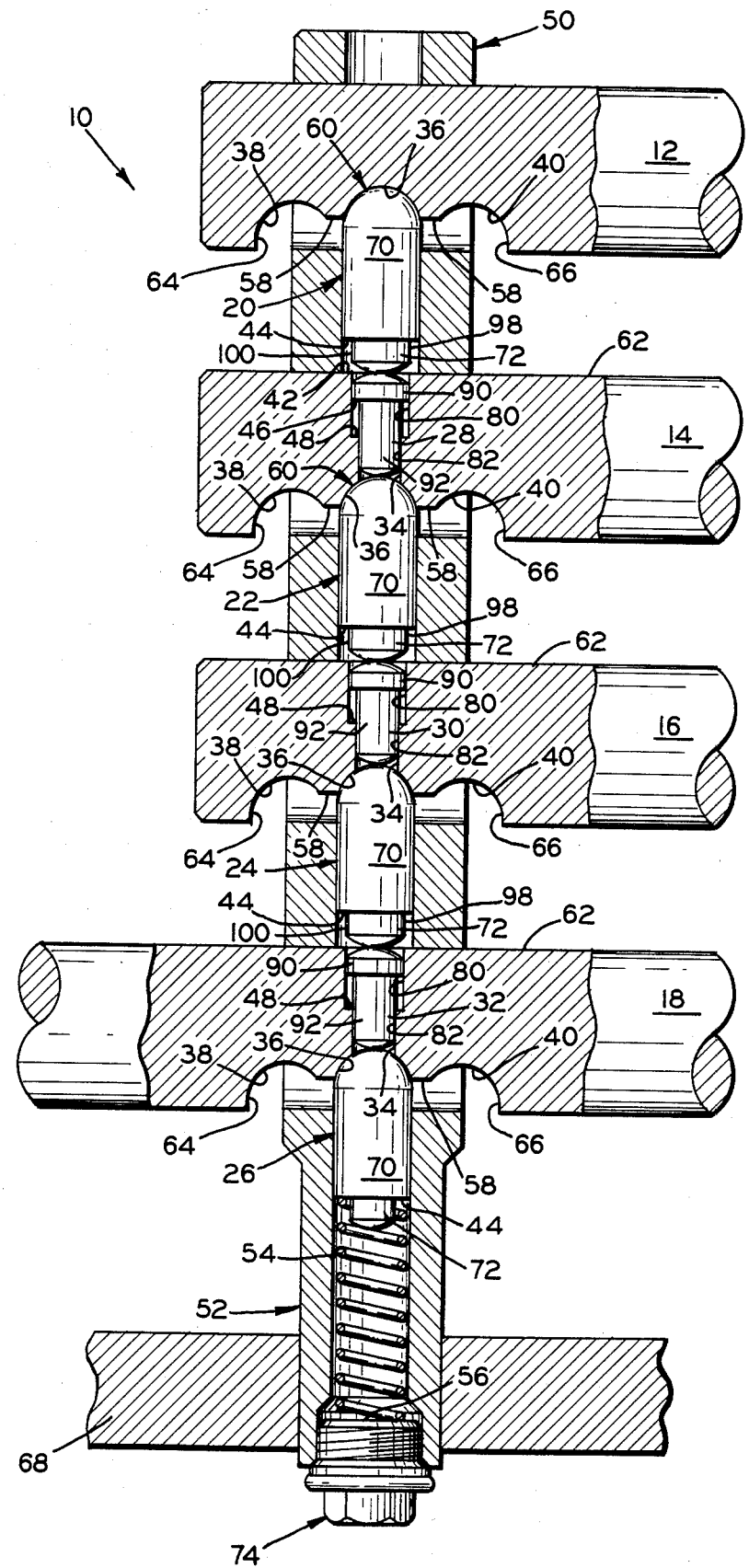

TRANSMISSION INTERLOCK SYSTEM

BACKGROUND OF THE INVENTION

This invention relates generally to transmission interlock devices, and particularly to poppet interlocks and pins coacting in a system of parallel shift rods.

Numerous prior art transmission interlock mechanisms have been proposed and tried with varying degrees of success. A major problem, however, is related to the complexity and expense of prior art apparatus utilized in achieving poppet interlock and positive stop functions. Both of these functions are inherently related to shift rail movement; the interlock function involving devices permitting movement of only one rail at a time, the positive stop function relating to permissible movement range of a given rail. The two concepts have not heretofore been combined in one simple mechanism, however, and each has been typically associated with bulky, cumbersome apparatus. For example, one prior art poppet interlock system requires two springs for each individual interlock, while prior art mechanisms designed to provide positive stop functions have traditionally utilized machine spacers in conjunction with transmission housing bosses or fork hubs.

Another problem of prior art interlock mechanisms has been related to an occasional overextension of the pins extending through shift rods. Such an event causes a transmission to become jammed, resulting in incapacitation of an associated vehicle.

SUMMARY OF THE INVENTION

The transmission interlock system described herein includes an apparatus which combines both poppet interlock and positive stop functions in a single mechanism. The apparatus is simple in both its features and operation, and represents a potentially significant cost savings over prior art devices. In addition, the apparatus prevents overextension of shift rod pins.

The system includes interlocks and pins alternately disposed transversely through and between alignable pin bores in a system of parallel shift rods. In a preferred embodiment, the poppet interlocks have large and small diameter portions, wherein the smaller interlock portions are disposed for extension into communicating pin bores. The interface between the small and large portions defines a shoulder on each interlock. The shoulder is disposed for contacting the extremity of an associated pin bore on a next adjacent shift rod for limiting interlock movement. Each pin also includes a shoulder, which is disposed for contacting a mating shoulder in an associated pin bore for correspondingly limiting pin movement. The pin and pin bore shoulders provide a mechanism for preventing overextension of the pins. Finally, each shift rod contains a pair of positive stop walls which bear against the interlocks to limit shift rod movement.

BRIEF DESCRIPTION OF THE DRAWING

The drawing FIGURE is a cross sectional view of a preferred embodiment of a shift interlock mechanism constructed in accordance with the present invention.

DETAILED DESCRIPTION OF A PREFERRED EMBODIMENT

Referring to the drawing, a transmission shift interlock mechanism 10 is constructed in accordance with the present invention. The mechanism 10 interacts with transmission shift rods 12, 14, 16, and 18, which are parallel and reciprocally slidable relative to each other. As per conventional practice, the purpose of the interlock mechanism 10 is to permit only one of the shift rods to be moved from its neutral position at any given time.

In sliding communication with each shift rod are shift poppet interlocks; shift poppet interlock 20 interacts with shift rod 12, interlock 22 with shift rod 14, interlock 24 with shift rod 16, and interlock 26 with rod 18. Three of the shift rods, rods 14, 16 and 18, contain pin bores 34 therethrough, the respective bores containing pin 28 in shift rod 14, pin 30 in rod 16, and pin 32 in rod 18. It will thus be apparent to those skilled in the art that whenever the central or neutral notch 36 of each of the shift rods are aligned as shown, a continuous line of coaction will be achieved between all of the interlocks and pins of the interlock mechanism 10.

Each of the shift rods contains left and right position notches 38 and 40 on respective sides of the center or neutral notch 36 thereon. The leftward or rightward movement of either of the shift rods 12, 14, 16, or 18, will cause an associated interlock to be compressed against the force of a single poppet spring 54. For example, upon leftward movement of the shift rod 14, the detent 58 thereon between the neutral notch 36 and right notch 40 will force the poppet interlock 22 downwardly against the spring force, thus in succession causing pin 30, interlock 24, pin 32, and interlock 26 to be urged downwardly against the spring force. The spring 54 is thereby compressed to enable the detent 58 to slide over and beyond the notch-engaging portion 60 of the large diameter end 70 of the interlock 22. Thus, the end 60 will engage the notch 40, the pin bore 34 of the shift rod 14 thus having been moved leftwardly so as to remove the pin 28 from any possible contact and hence from coaction with the interlock 20.

In the latter position of shift rod 14, it will also be seen that the shift rod 12 will be axially immobile, since the poppet interlock 20 will be wedged between the center notch 36 of the rod 12 and the top surface 62 of the rod 14. Similarly, the shift rod 16 will be immobile as the small diameter end 72 of the interlock 22 will be extended into a large diameter portion 80 of the pin bore 34 of the rod 16. Similarly, shift rod 18 will be immobile because the small diameter end 72 of the interlock 24 will extend into the large diameter portion 80 of the pin bore 34 of the rod 18. Thus, those skilled in the art will appreciate that the mechanism of the interlock system 10 provides for prevention of left and right movement of more than one rod at a time.

A noteworthy feature of the present invention lies in its utilization of perpendicularly disposed interlocking devices. Hence, the small diameter ends 72 of each interlock defines a shift rod contact surface 98 which extends entirely perpendicularly to the axis of a communicating rod. The ends 72 of each interlock engage a respective large diameter portion 80 of a pin bore 34 which thereby defines a matingly engageable interlock contact surface 100, also perpendicularly disposed relative to the shift rod axes. The later contact surfaces 98,100 are thus not at a "wedgedeventual slippage or undesirable relative movement between interlock and shift rod due to wear of the latter engaging surfaces over time.

The interlock mechanism 10 is housed in an interlock yoke 50, which includes a spring housing 52. In the preferred form of this invention, the spring housing is secured to a fixed wall of a transmission shifter housing 68. The spring 54 is carried in the spring housing, the spring being under constant compression loading between a spring housing floor 56 and the bottom poppet interlock 26. In the preferred embodiment shown, the floor 56 is formed in a plug 74 which is removable to provide access to the spring 54. In the neutral position as shown, the spring 54 is effective to load all of the poppet interlock and pin members. In any other position of the transmission, i.e. whenever the transmission is in gear, the spring 54 will be held compressed, and thus will be ineffective to transmit a spring force through all of the poppet interlock and pin members.

Each poppet interlock 20, 22, 24, 26 has a stepped diameter which results in coaxially oriented, cylindrically shaped large and small diameter ends 70, 72. A poppet interlock shoulder 44 is thus defined by the interfaces of the large and small diameter ends 70 and 72 of each interlock. Similarly, each pin bore 34 is also stepped, wherein large and small diameter portions 80, 82 are defined, and wherein the interface between the portions 80 and 82 is defined by a pin bore shoulder 48. Each pin 28, 30, 32 likewise includes large and small diameter portions 90, 92 respectively, wherein a pin shoulder 46 is defined at the interface of the latter diameters. It will thus be apparent to those skilled in the art that each pin shoulder 46 coacts with a respective pin bore shoulder 48 to limit the movement of each pin in the direction toward the spring 54, while each poppet interlock shoulder 44 of interlocks 20, 22 and 24 makes contact with a respective pin bore extremity 42 on the tops 62 of rods 12, 14, and 16 to likewise limit the movement of the respective interlocks toward the spring 54. (The shoulder 44 of interlock 26 constantly bears directly against the spring 54.) As a result, each of the interlock and pin members (with the exception of interlock 26) are restricted from overextension in a direction toward the spring, a problem particularly associated with prior art pins.

Finally, another feature of the present invention lies in its inclusion of a simple positive stop mechanism for limiting shift rod movement. Thus, it will be noted that the notches 38 and 40 of each shift rod define transversely extending walls 64 and 66 at their extremities. The walls provide axial limits of movement of rods 12, 14, 16, and 18 to the extent that the latter bear directly against the interlocks 20, 22, 24, and 26, respectively.

Although only one preferred embodiment is described in detail herein, many other variations of the above-described invention may fall within the scope of the appended claims.

What is claimed is:

1. In a transmission including shift rods oriented along parallel axes, said rods selectively movable between axially spaced gear positions, said rods reciprocally slidable relative to each other, said rods each including interlock notches, all except at least one of said rods including a bore extending transversely to said axes, each bore communicating with one of said notches, each bore containing an interlock pin, said transmission further including a plurality of interlocks, each interlock being registrable with the notches on one of said rods, one interlock being disposed between each pair of pins for coaction therewith, and spring means for loading said springs and interlocks together; an improvement comprising said interlocks each defining a pair of large and small diameter coaxially oriented cylindrical ends, wherein small diameter ends are disposed for extension into said pin bores.

2. The transmission of claim 1 further comprising shoulders on said interlocks disposed for contacting extremitites of said pin bores in said rods for limiting movement of said interlocks.

3. The transmission of claim 2 further comprising shoulders on said pins for limiting movement of said pins.

4. The transmission of claim 3 wherein said pin bores in said rods also have shoulders which mate with said shoulders of said pins to limit said movement of said pins.

5. The transmission of claim 4 further comprising three axially spaced notches corresponding to each of said spaced gear positions, each of said notches for selectively receiving one of said large diameter portions of said interlocks, the center notch of each shift rod defining a neutral gear position of that rod, the outer notches defining left and right gear positions.

6. The transmission of claim 5 comprising an interlock yoke containing said spring means, said spring means comprising a spring and a spring housing.

7. The transmission of claim 6 wherein said spring housing includes a spring housing floor, wherein said spring is disposed under constant compression between said floor and one of said interlocks.

8. The transmission of claim 7 further comprising a linear coaction of all of said poppet interlocks and pins whenever said transmission is in said neutral gear position.

9. The transmission of claim 8 further comprising detents between said notches on said rods for loading said interlocks between gear positions against said spring.

10. The transmission of claim 9 further comprising transversely extending walls on said left and right gear position notches for limiting shift rod movement.

11. A transmission including shift rods selectively movable between axially spaced gear positions, said rods being parallel and reciprocally slidable relative to each other, said rods each including interlock notches, at least all except one of said rods including a bore extending transversely to said shift rods, each bore communicating with one of said notches, each bore containing an interlock pin, said transmission further including a plurality of interlocks, each interlock being registrable with the notches on one of said rods, one interlock being disposed between each pair of pins for coaction therewith, and spring means for loading said pins and interlocks together; and interlocks having small and large diameter portions, the small diameter portions disposed for extension into said pin bores, each of said rods having three notches for engaging the large diameter portions of said interlocks, wherein the center notch of each rod defines a neutral gear position on that rod.

* * * * *

UNITED STATES PATENT OFFICE
CERTIFICATE OF CORRECTION

PATENT NO. : 4,550,628
DATED : November 5, 1985
INVENTOR(S) : James A. Yarnell

It is certified that error appears in the above-identified patent and that said Letters Patent are hereby corrected as shown below:

In Column 2, line 62:
Please delete the expression '"wedgedeventual' and substitute --"wedged" angle relative to the shift rod movement, and are hence not as likely to permit eventual-- therefor.

Signed and Sealed this

Twelfth Day of April, 1988

Attest:

DONALD J. QUIGG

*Attesting Officer*         *Commissioner of Patents and Trademarks*